United States Patent
Valenziano

[19]

[11] Patent Number: 6,039,359
[45] Date of Patent: Mar. 21, 2000

[54] PROTECTIVE SLEEVE AND RELATED METHOD FOR PROTECTING A BURIED PIPE JOINT

[75] Inventor: Frank P. Valenziano, Warren, N.J.

[73] Assignee: Coreflex LLC, Asbury Park, N.J.

[21] Appl. No.: 09/028,166

[22] Filed: Feb. 23, 1998

[51] Int. Cl.[7] .............................. F16J 15/10; F16L 55/175
[52] U.S. Cl. .................... 285/45; 285/294.2; 285/230; 285/925
[58] Field of Search .................... 285/45, 294.2, 285/925, 230, 235, 237, 422

[56] References Cited

U.S. PATENT DOCUMENTS

| 413,170 | 10/1889 | Camp | 285/294.2 |
|---|---|---|---|
| 1,238,383 | 8/1917 | Blumenthal | 285/294.2 |
| 1,823,974 | 9/1931 | Ferguson | 285/294.2 |
| 1,959,421 | 5/1934 | Hardesty | 285/294.2 |
| 3,767,232 | 10/1973 | Smith | 285/230 |
| 4,443,282 | 4/1984 | Stachitas | 285/230 |
| 4,703,940 | 11/1987 | Dana | 285/230 |
| 5,096,206 | 3/1992 | Andre et al. | 285/925 |
| 5,413,385 | 5/1995 | Hilbush, III | 285/294.2 |

*Primary Examiner*—Eric K. Nicholson
*Attorney, Agent, or Firm*—Charles E. Baxley, Esq.

[57] ABSTRACT

The present invention teaches a concrete pipe joint construction which includes a steel bell and a spigot joint ring, both protected by an alkali releasing substance contained typically in a composite sleeve. When the spigot is engaged sealably into the bell an external joint recess is formed. The present advance is to add a sleeve made of a polyurethane foam material having the alkali releasing substance dispersed therein. The sleeve has an impermeable outer surface and goes around the outside of the joint and is banded sealably to both of the pipes. By this expedient, if and when ground water penetrates into the joint recess, the alkaline material is released from the sleeve to protect exposed steel from corrosion.

2 Claims, 3 Drawing Sheets

PROTECTIVE SLEEVE AND RELATED METHOD FOR PROTECTING A BURIED PIPE JOINT

BACKGROUND OF THE INVENTION

1. Field of the Invention

In protecting metal of joints of underground pipe systems, particularly steel reinforced or prestressed concrete pressure pipe.

2. Prior Art

Several types of concrete pressure pipe joints include steel bell and spigot rings in conjunction with an O-ring to hydrostatically seal the joint. A current method for externally protecting the joint rings from corrosion is to pour portland cement grout into a recess of the joint. The method requires use of a diaper-like band to contain the grout. In addition the method requires portland cement, sand and water to be available as grout ingredients at the installation site of the pipeline. Workers mix these components to make the grout and then pour the grout into the joint recess. The grout provides an important alkaline environment to prevent corrosion of any exposed steel. Properly executed, the method effectively protects the external joint areas, but it is labor intensive and sensitive to human mistakes. In addition, hardened mortar is subject to cracking in the event that there is settlement of the pipeline. The grout band extends several inches longitudinally, on each side of the joint, in order to seal any coating cracks which may occur and which may give rise to corrosion of reinforcing steel or prestressing wire.

Prior art patents show similar arrangements but do not anticipate nor render obvious the present invention.

U.S. Pat. No. 3,228,712 to Hausmann et al. disclosed a pipe joint wherein pipe sections are joined together and grout is placed in the pipe joint which is covered by a foam and an impermeable band. The band is held onto the pipe by means of metal straps. The Hausmann invention discloses a polyethylene foam mechanically bonded to the grout in the pipe joint in order to span any cracks in the mortar occurring as a result of pipeline settlement. It is anticipated that the bands (diapers) and straps will disintegrate with time.

U.S. Pat. No. 5,527,070 to Blackwell illustrates a pipe joint wherein a plastic-like cushion layer is provided at the joint and the same is covered with a film wrap. The Blackwell invention is designed to protect relatively small diameter cast iron pipe from mechanical damage when installed in expansive soils. In addition, the entire pipe is wrapped in the plastic film.

U.S. Pat. No. 4,443,282 to Stachitas disclosed a pipe joint wherein the joint connection has an elastomeric band around the joint and mastic is provided under the band. The Stachitas band is designed to seal a non-pressure joint from infiltration of ground water.

U.S. Pat. No. 5,096,206 to Andre et al. disclosed a pipe joint sealed by mastic or a gasket and then a seal member is placed over the joint and secured by means of straps. Andre's approach discloses a band that must seal a joint which has no other means for sealing or a backup sealant when O-rings are used in the joint.

U.S. Pat. No. 5,531,485 to House et al. shows a pipe joint provided with an elastomeric band and adhesive seal arranged circumferentially around a juncture of two pipes. The House band of this invention is designed to seal a non-pressure joint from infiltration of ground water.

SUMMARY OF THE INVENTION

It is an object of the present invention to provide for in-ground installation of a concrete pipe joint protection system so as to prevent corrosion of any steel at their pipe ends.

Still another object of the invention is to improve service life of pipe systems as here contemplated.

Still another object of this invention is to provide a pipe joint protection system as here contemplated for placing an inorganic alkaline environment at less cost, using less personnel and requiring less equipment and materials than by prior art pipe systems, and still to provide corrosion protection equivalent to prior art pipe systems.

Still another object of this invention is to provide a pipe system as here contemplated that is virtually foolproof and easy to check.

The present invention resides in reinforced or prestressed concrete pipe systems typically constructed with steel bell and spigot and rubber O-ring joint rings. To protect the steel bell and spigot and any exposed reinforcing steel or prestressing wire at pipe ends, portland cement grout commonly is poured into the external joint. Exposure of the steel or wire may occur as a result of damage during shipping and handling or during assembly of the joint. The present invention eliminates need to pour a liquid grout into the joint by positioning a dry form of portland cement outwardly of the joint recess. External to the portland cement carrier, an impermeable sleeve is banded to the joint. In this manner, when and if ground water penetrates the joint recess, a resulting alkaline solution will provide corrosion protection to exposed steel. If the banding of the impermeable sleeve results in a watertight seal, the potential for corrosion is essentially eliminated.

The foregoing and other objects and advantages of the present invention will appear more clearly hereinafter. In accordance with the present invention there is provided a protective sleeve for buried concrete pipe joints with steel joint rings.

BRIEF DESCRIPTION OF THE DRAWINGS

Other important objects and advantages of the present invention will be apparent from the following detailed description taken in connection with the accompanying drawings in which.

DESCRIPTION OF PREFERRED EMBODIMENT

Figure 1:
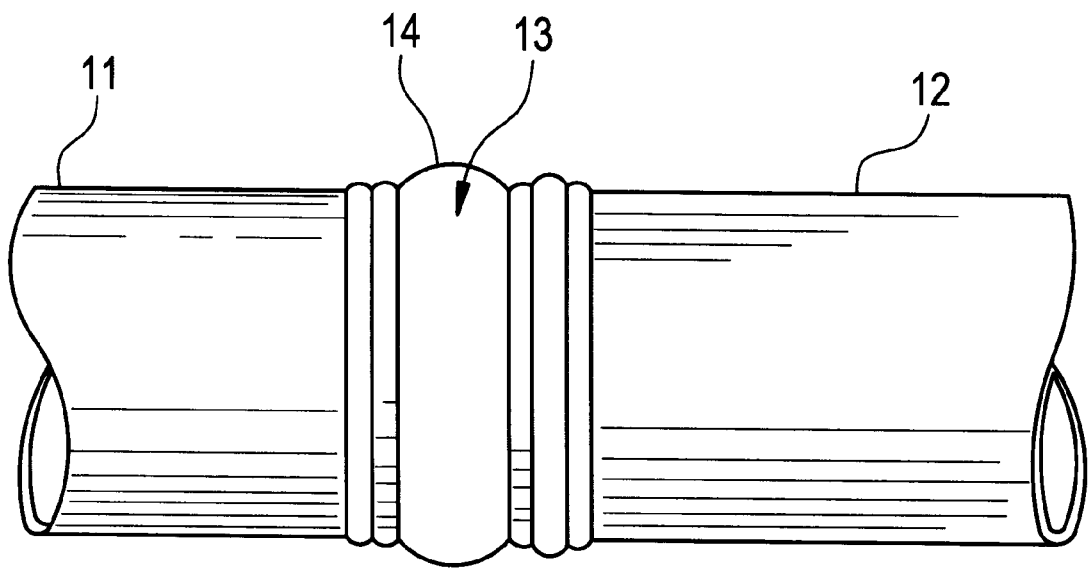
FIG. 1 is an elevational view of adjacent end portions of two installed pipe sections and a joint therebetween.

More particularly, describing the invention in FIG. 1, two joined pipe sections 11 and 12 are shown with a joint area 13 therebetween covered by a sleeve 14 embodying the invention.

Figure 2:
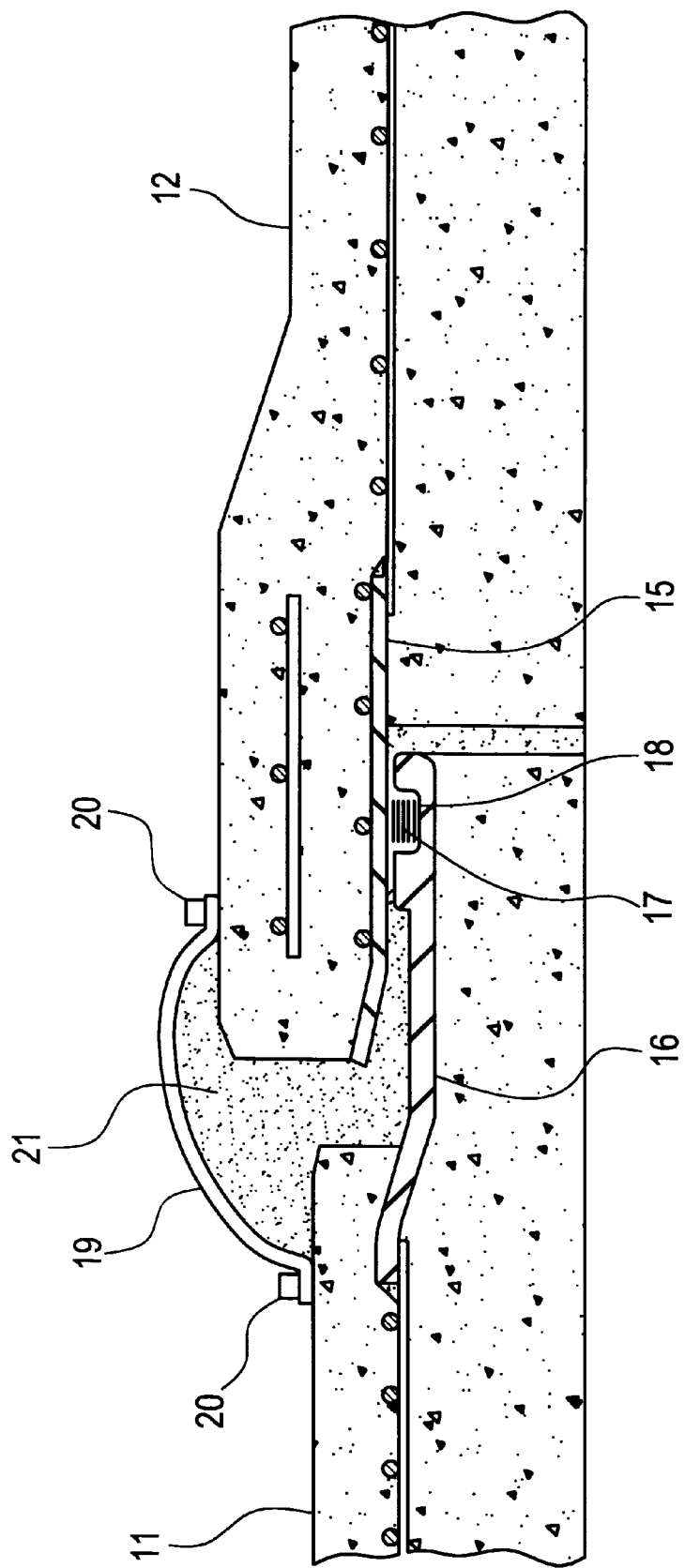
FIG. 2 is a fragmentary sectional view through a completed grouted joint according to prior art, on a larger scale than FIG. 1.

Referring now to FIG. 2, the prior art, the pipe section 12 is shown as having a steel bell 15 for receiving a steel spigot 16 of a next adjacent pipe section. A rubber gasket 17 or the like is provided between the bell 15 and the spigot 16 in a groove 18. A temporary diaper 19 is wrapped around meeting ends of the adjacent pipe sections and secured in place by temporary metal straps 20. This diaper serves as a mold when subsequently fluid mortar or grout 21 is poured through an opening at the top of the band 19. As is apparent, external protection of the pipe ends not only requires installation of the diaper 19 about an assembled joint but also requires logistics of the mortar. Water, sand and portland cement along with a mixer must be available to a job site and, when pouring the grout, a tight band is essential. In addition, rodding of the fluid mortar usually is necessary to insure its uniform positioning around the entire joint recess. In a matter of hours the grout hardens. If and when the pipeline settles the hardened grout cracks, jeopardizing the prior art method of joint ring protection. Also the diaper 19 is permeable to allow excess grout water to leak out of the joint recess.

Figure 3:
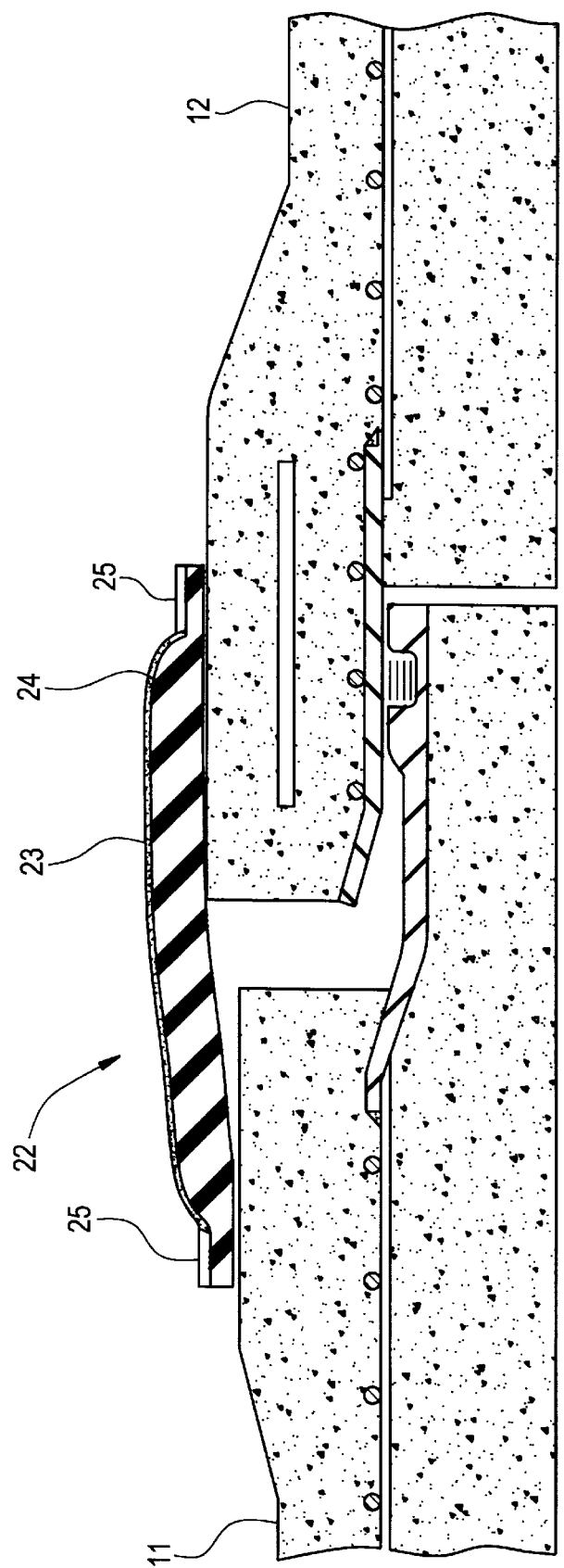
FIG. 3 is a fragmentary sectional view of the present invention through a completed joint, on a scale similar to that of FIG. 2.

As shown in FIG. 3, the present invention only requires installation of a sleeve 22 around and spanning adjacent ends of the assembled pipes 11 and 12. Outer surface 23 of the sleeve 22 is moisture impermeable while an inner surface comprises a permeable material that contains an inorganic alkaline material. An ideal material is the polyurethane system disclosed in U.S. Pat. No. 3,923,311 located inside the impermeable membrane 23. With an elastomeric foam as disclosed in U.S. Pat. No. 3,923,311, we obtain a watertight seal when bands 25 are tightened. Obtaining this seal, however, is not critical. Permanent bands 25 of plastic or stainless steel preferably are used to secure the sleeve to the pipe ends. The outer surface preferably is a durable polyethylene or polypropylene film or the like. The sleeve 22 preferably is continuous circumferentially in which case it can be placed over one pipe end prior to inserting the spigot end of the one pipe into the bell end of a next adjacent pipe. After jointing is completed and the sealing gasket checked, the sleeve 22 is then centered over the joint recess and banded permanently to the external surface of the pipes. The sleeve 22 could be non-continuous with a longer length and overlapping at a circumferential joint. Means well known in the art are available to make this overlap joint watertight. Here it should be noted that the invention disclosed in U.S. Pat. No. 3,923,311 provides an alkaline environment to the steel joint ring surfaces, but it does not offer protection against damage to ends of the pipes.

The present invention provides needed protection to the pipe ends. Damaged ends, typically with delaminations and/or cracks that may result from careless handling during shipment and installation or joining of the pipes, are protected.

Two significant advantages are apparent with the present invention. First, it only requires installation of the sleeve to protect a joint from corrosion. The entire process of mortar placement is avoided. Secondly, the joint remains indefinitely flexible, eliminating concern about cracking of the mortar in the event there is settlement of the pipeline after hardening of the joint mortar.

It will be apparent to those skilled in the relevant art that wide deviations may be made from claims which follow, without departing from a main theme of invention set forth therein.

I claim:

1. A pipe joint construction comprising in combination:

a tubular concrete first pipe section having an annular front end and provided with a tubular steel spigot projecting forwardly from the front end, the spigot terminating in a leading end and forming an annular ring groove spaced rearwardly from the leading end, a resilient gasket positioned in the ring groove, a tubular concrete second pipe section having an annular rear end and provided with a steel bell projecting rearwardly from the rear end and having an inside annular face, the spigot inserted into the bell in end-to-end relationship with the gasket compressed in the ring groove by the inside annular face, a sleeve made of a polyurethane foam material having an inorganic alkaline releasing material dispersed therein, the alkaline releasing material being reactive with water to hydrate thereby forming an alkaline substance to protect exposed steel, the sleeve having a moisture impervious outward surface and a moisture pervious inward surface, the sleeve spanning from the first pipe section to the second pipe section sealing outwardly a joint formed therebetween, the sleeve extending annularly about the joint and over end margins of both of said pipe sections to protect embedded steel in the margins from corrosion due to surface cracks, and each of said outer margins connected to the sleeve by means of a tightening band.

2. The pipe joint construction as claimed in claim 1 with the inorganic alkaline releasing material being portland cement.

* * * * *